(12) United States Patent  
Lin et al.

(10) Patent No.: US 10,809,484 B2  
(45) Date of Patent: Oct. 20, 2020

(54) LENS MODULE

(71) Applicants: Sintai Optical (Shenzhen) Co., Ltd., ShenZhen, Guangdong Province (CN); Asia Optical Co., Inc., Taichung (TW)

(72) Inventors: Guo-Quan Lin, ShenZhen (CN); Ming-Wei Shih, Taichung (TW)

(73) Assignees: SINTAI OPTICAL (SHENZHEN) CO., LTD., Shenzhen, Guangdong Province (CN); ASIA OPTICAL CO., INC., Taichung (TW)

( * ) Notice: Subject to any disclaimer, the term of this patent is extended or adjusted under 35 U.S.C. 154(b) by 169 days.

(21) Appl. No.: 16/105,247

(22) Filed: Aug. 20, 2018

(65) Prior Publication Data

US 2019/0113705 A1 Apr. 18, 2019

(30) Foreign Application Priority Data

Oct. 16, 2017 (TW) .............................. 106215182 U  
Dec. 1, 2017 (CN) .......................... 2017 1 1251452

(51) Int. Cl.
    *G02B 7/02* (2006.01)
    *G02B 27/64* (2006.01)
    *G02B 7/09* (2006.01)

(52) U.S. Cl.
    CPC .............. *G02B 7/021* (2013.01); *G02B 7/09* (2013.01); *G02B 27/646* (2013.01)

(58) Field of Classification Search
    None
    See application file for complete search history.

(56) References Cited

U.S. PATENT DOCUMENTS

2007/0115565 A1* 5/2007 Shyu ...................... G02B 7/102  
                                                        359/811  
2015/0009401 A1* 1/2015 Lee ....................... H04N 5/2257  
                                                        348/374  
2018/0081164 A1* 3/2018 Ito ....................... A61B 1/00002

FOREIGN PATENT DOCUMENTS

CN          104541199 A       4/2015  
TW          I537628 B         6/2016

* cited by examiner

*Primary Examiner* — William R Alexander  
*Assistant Examiner* — Gary W O'Neill  
(74) *Attorney, Agent, or Firm* — McClure, Qualey & Rodack, LLP

(57) ABSTRACT

A lens module includes a first lens barrel and a first element. The first lens barrel includes a first outer wall and a plurality of first lenses, wherein the first lenses have an optical axis formed from an object side to an image side. The first element is configured to carry the first lens barrel and includes an outer circumferential portion, wherein the outer circumferential portion surrounds the optical axis and includes at least four barriers. The barriers form an accommodating space in which the first lens barrel is disposed. At least one of the barriers has an opening portion to expose the first outer wall of the first lens barrel. The first outer wall of the first lens barrel is not protruded from the opening portion.

20 Claims, 11 Drawing Sheets

LENS MODULE

BACKGROUND OF THE INVENTION

Field of the Invention

The invention relates to a lens module, and more particularly to a lens module applied to an optical apparatus.

Description of the Related Art

Generally, a prior optical apparatus (such as mobile phone) is provided with a lens module to capture images.

BRIEF SUMMARY OF THE INVENTION

To meet the requirement of miniaturization of optical apparatuses (e.g. mobile phones), the invention is dedicated to reducing the height (or thickness) of lens modules. The invention provides a lens module including a lens barrel, wherein the height (or thickness) of the lens module substantially equals that of the lens barrel after assembly of the lens module, so that the optical apparatus provided with the lens module can be miniaturized.

A lens module in accordance with an embodiment of the invention includes a first lens barrel and a first element. The first lens barrel includes a first outer wall and a plurality of first lenses, wherein the first lenses have an optical axis formed from an object side to an image side. The first element is configured to carry the first lens barrel and includes an outer circumferential portion, wherein the outer circumferential portion surrounds the optical axis and includes at least four barriers, and the barriers form an accommodating space in which the first lens barrel is disposed. At least one of the barriers has an opening portion to expose the first outer wall of the first lens barrel, and the first outer wall of the first lens barrel is not protruded from the opening portion.

In another embodiment, at least one of the barriers is provided with a first guiding groove parallel to the optical axis, the first outer wall of the first lens barrel has a first rib parallel to the optical axis, and the first rib is disposed in the first guiding groove.

In yet another embodiment, the invention further includes a second lens barrel, wherein the second lens barrel includes at least one second lens and is disposed in the accommodating space.

In another embodiment, at least one of the barriers is provided with a second guiding groove parallel to the optical axis, the second lens barrel includes a second outer wall, the second outer wall of the second lens barrel has a second rib parallel to the optical axis, and the second rib is disposed in the second guiding groove.

In yet another embodiment, the first guiding groove, the second guiding groove and the optical axis are coplanar.

In another embodiment, the invention further includes a first driver configured to drive the first lens barrel to move in a direction perpendicular or parallel to the optical axis.

In yet another embodiment, the first driver comprises a first magnetic element and a first coil, the first magnetic element is fixed outside at least one of the barriers, and the first coil is disposed opposite the first magnetic element.

Moreover, capabilities of auto focusing (AF) or optical image stabilization (OIS) have been required. To meet the requirements, therefore, the invention provides a lens module capable of auto focusing (AF) or optical image stabilization (OIS) by an internal guiding structure.

A lens module in accordance with another embodiment of the invention includes a lens barrel, a first element, a base, at least one first rod, at least one elastic element and a driver. The lens barrel includes an outer circumferential portion and at least one lens, wherein the lens has an optical axis. The first element is connected to the outer circumferential portion of the lens barrel. The base includes a plate and a plurality of first barriers, wherein the first barriers are disposed on the plate and opposite each other, the plate and the first barriers form an accommodating space, the lens barrel is disposed in the accommodating space, and the first barriers have at least one first hole. At least one first rod is penetrated through the first hole to define an axial direction perpendicular to the optical axis. At least one elastic element includes an end portion fixed to the base, and another end portion fixed to the first element, so that the first element can return to and be kept at a location after moved away from the location with respect to the base. The driver is configured to drive the lens barrel to move in the axial direction of the first rod or along the optical axis.

In another embodiment, the first element includes a plurality of second barriers disposed opposite each other and the second barriers have at least one second hole.

In yet another embodiment, the first rod is penetrated through the first hole and the second hole, and the first hole is disposed opposite the second hole. The second hole is greater than the first rod in diameter when the first hole is fixed to the first rod, or the first hole is greater than the first rod in diameter when the second hole is fixed to the first rod. The driver is configured to drive the first element to move the lens barrel along the optical axis and in the axial direction of the first rod, or the driver is configured to drive the base to move the first rod so that the lens barrel is moved along the optical axis and in the axial direction of the first rod.

In another embodiment, the invention further includes a plurality of limiting elements and at least one second rod. The limiting elements are disposed between the first element and the base and have a first through hole extending perpendicular to the optical axis and a second through hole extending parallel to the optical axis, wherein the first rod is penetrated through the first hole and the first through hole, and the limiting element is disposed around the first rod. The second rod is penetrated through the second through hole and includes two ends, wherein the second barriers have a plurality of second holes, the ends are penetrated through the second holes, the second holes extend parallel to the optical axis, and the limiting element is disposed around the second rod. The driver is configured to drive the first element to move the lens barrel along the optical axis and in the axial direction of the first rod, or the driver is configured to drive the base to move the first rod so that the lens barrel is moved along the optical axis and in the axial direction of the first rod.

In yet another embodiment, the first through hole is greater than the first rod in diameter when the first hole is fixed to the first rod, or the first hole is greater than the first rod in diameter when the first through hole is fixed to the first rod.

In another embodiment, the invention further includes a cover. The cover is configured to accommodate the lens barrel and the base, wherein the cover includes a third opening portion, the third opening portion is provided on a top surface of the cover facing and parallel to the plate, and the lens barrel further includes a surface facing the top surface of the cover having the third opening portion.

In yet another embodiment, the first element includes a first opening portion which is provided on a top surface facing and parallel to the plate, a maximum measurement of the first opening portion is greater than a maximum measurement of the third opening portion and greater than a maximum measurement of a corresponding portion of the lens barrel, and the maximum measurement of the third opening portion is greater than the maximum measurement of a corresponding portion of the lens barrel.

In another embodiment, the lens module sequentially includes the cover, the first element, the lens barrel and the base in an axial direction perpendicular to the optical axis and the first rod, and the first element is fixed to the lens barrel by means of a first connecting surface.

In yet another embodiment, the lens module sequentially includes the cover, the first barriers, the first element, the plate and the lens barrel in the axial direction of the first rod, an inner surface of the cover contacts the first barriers and the first element, and the first element is fixed to the lens barrel by means of a first connecting surface.

In another embodiment, the outline of the lens barrel is non-circular when observed from an object side.

In yet another embodiment, the base and the first barriers constitute a first construction, the lens barrel and the first element constitute a second construction, the first barriers and the first rod constitute a third construction, and at least one of the first construction, second construction, and third construction are integrally-formed unitary construction.

In another embodiment, the base and the first barriers constitute a first construction, the lens barrel and the first element constitute a second construction, the first barriers and the first rod constitute a third construction, the first element and the second rod constitute a fourth construction, and at least one of the first construction, second construction, third construction, and fourth construction are integrally-formed unitary construction.

In yet another embodiment, the driver is an electromagnetic driver, includes at least one magnetic element and at least one coil and is configured to drive the lens barrel to move in the axial direction of the first rod.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
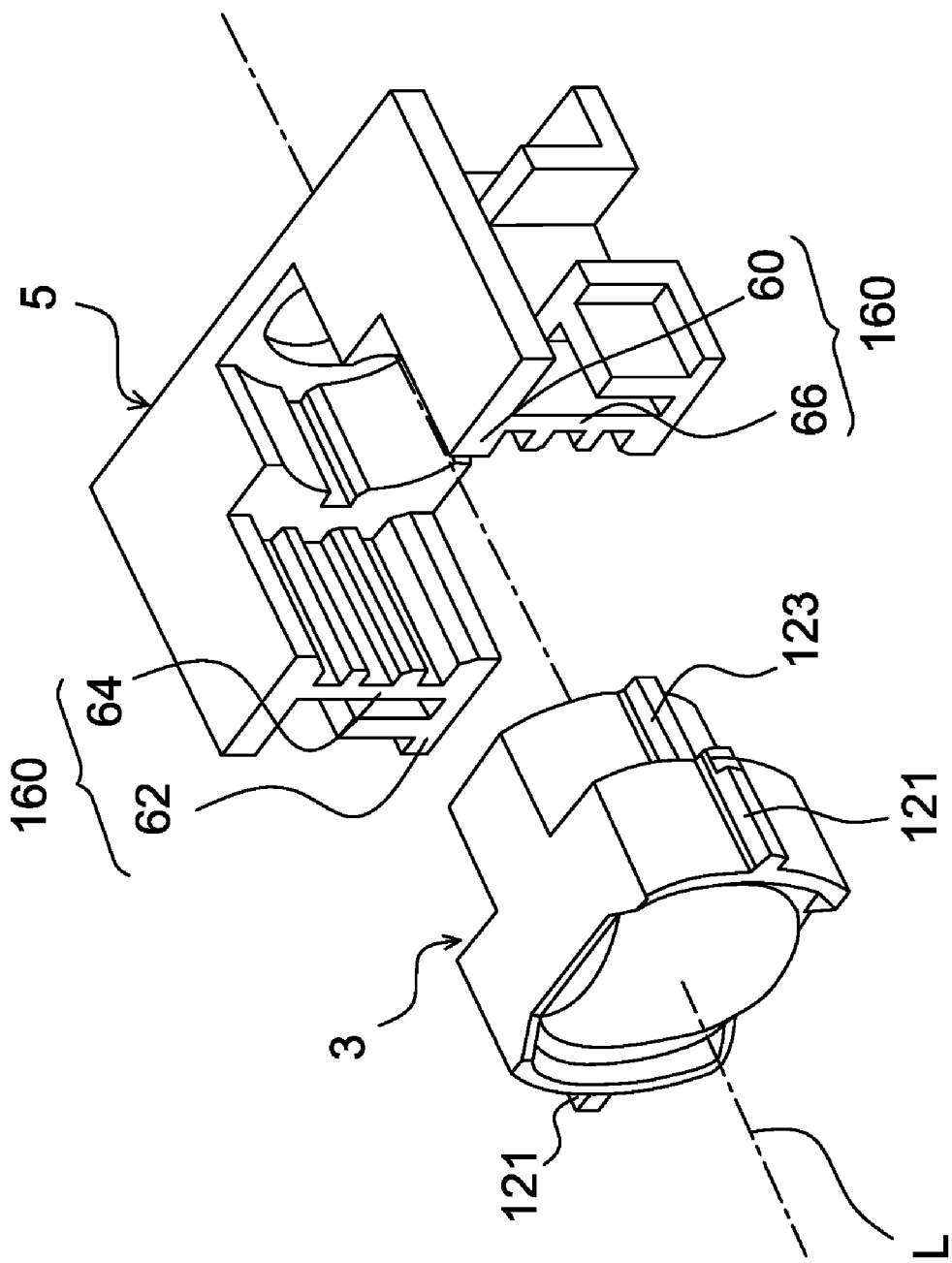
FIG. 1 is an exploded view of an lens module in accordance with a first embodiment of the invention.

Referring to FIG. 1, a lens module 1 in accordance with a first embodiment of the invention includes a first lens barrel 3 and a first element 5, wherein the first element 5 is configured to carry the first lens barrel 3.

The first lens barrel 3 includes a plurality of first lenses (not shown) which have an optical axis L formed from an object side to an image side. As shown in FIG. 1, an outer wall of the first lens barrel 3 has two first ribs 121 and two second ribs 123, wherein the first ribs 121 and the second ribs 123 are parallel to the optical axis L (only one second rib 123 is shown in FIG. 1 since the viewing angle is fixed).

Figure 2:
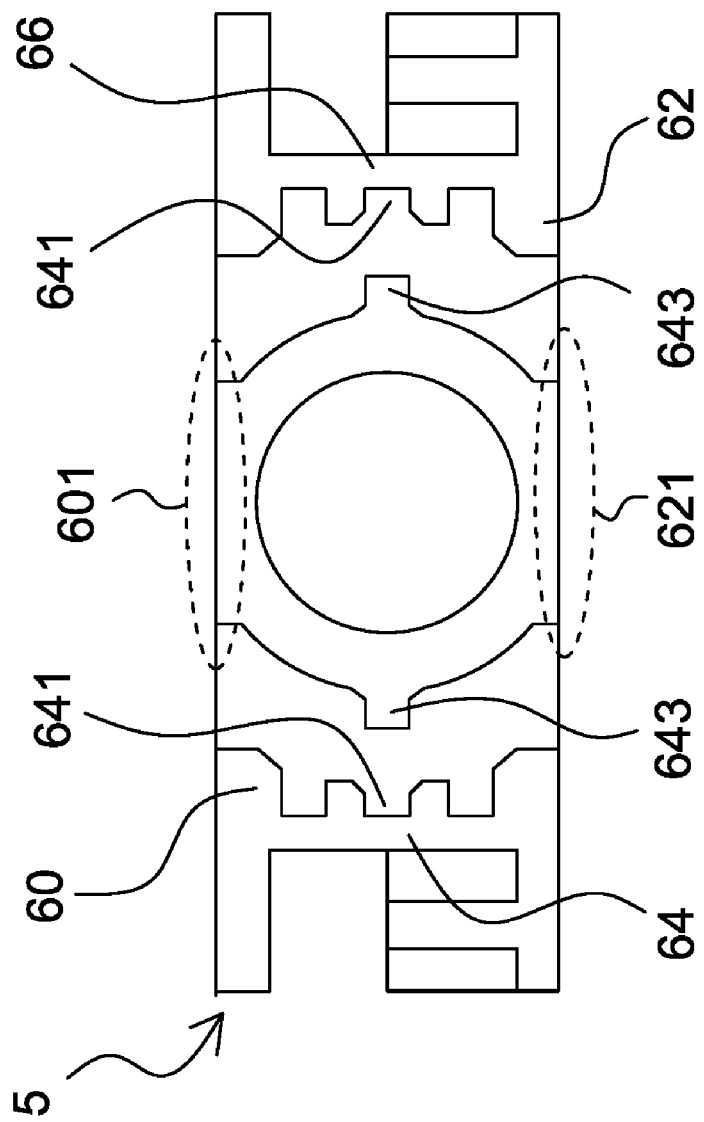
FIG. 2 is a frontal view of a first element of FIG. 1.

Referring to FIGS. 1 and 2, the first element 5 includes an outer circumferential portion 160. The outer circumferential portion 160 has a first barrier 60, a second barrier 62, a third barrier 64 and a fourth barrier 66, wherein the first barrier 60 and the second barrier 62 are disposed opposite each other, and the third barrier 64 and the fourth barrier 66 are disposed opposite each other. As shown in FIG. 1, the first barrier 60, the second barrier 62, the third barrier 64 and the fourth barrier 66 form an accommodating space. As shown in FIG. 2, the third barrier 64 is provided with a guiding structure, and the guiding structure includes a first guiding groove 641 and a second guiding groove 643. The fourth barrier 66 is provided with another guiding structure, and the guiding structure includes another first guiding groove 641 and another second guiding groove 643. That is, the first element 5 is provided with two first guiding grooves 641 and two second guiding grooves 643. Moreover, the first barrier 60 has a first opening portion 601, and the second barrier 62 has a second opening portion 621.

Figure 3:
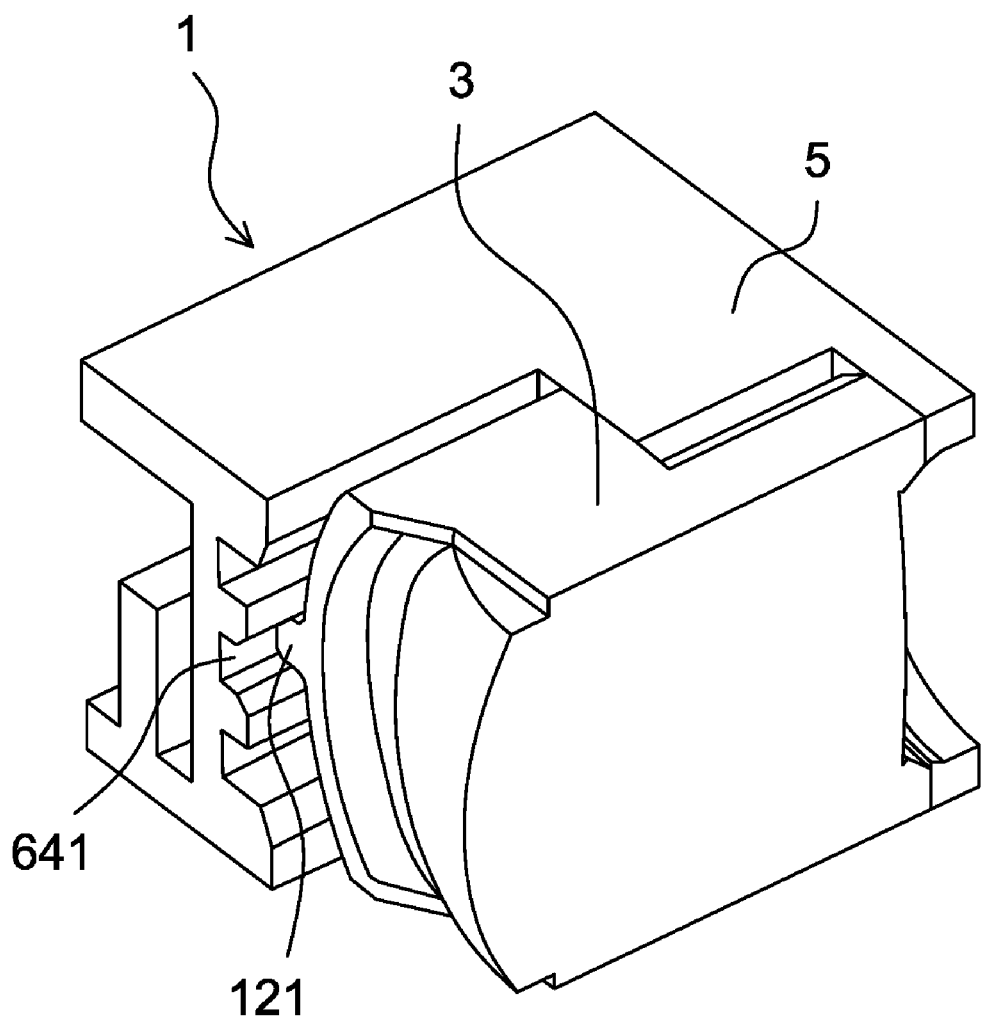
FIG. 3 is a sectional view of the assembled lens module of FIG. 1.

Referring to FIG. 3, when the first lens barrel 3 and the first element 5 are assembled, the first lens barrel 3 is disposed in the accommodating space, the first ribs 121 are disposed in the first guiding grooves 641, and the second ribs 123 are disposed in the second guiding grooves 643, so that the first lens barrel 3 can be moved with respect to the first element 5 along the optical axis L. Meanwhile, the outer circumferential portion 160 surrounds the optical axis L, and the first guiding grooves 641, the second guiding grooves 643 and the optical axis L are coplanar. It is worth noting that the outer wall of the first lens barrel 3 is exposed from the first opening portion 601 and the second opening portion 621 and is not protruded from the circumferential portion 160. In such arrangement, the height (or thickness) of the first element 5 carrying the lens barrel 3 is not increased. Thus, an optical apparatus (for example, mobile phone) provided with the lens module 1 can be miniaturized.

The lens module 1 further includes two drivers (not shown) and a base (not shown), and each driver includes a first magnetic element (not shown), a first coil (not shown), a second magnetic element (not shown) and a second coil (not shown). One of the first magnetic elements and one of the second magnetic elements are fixed outside the third barrier 64, and the other first magnetic element and the other second magnetic element are fixed outside the fourth barrier 66. The first coils and the second coils are disposed on the base. It is worth noting that the first coils and the first magnetic elements are disposed opposite each other, and the second coils and the second magnetic elements are disposed opposite each other. When current flows through the first coils or the second coils, the electrons therein experience a Lorentz force produced by the first magnetic elements or the second magnetic elements so that the lens barrel 3 can be moved to a predetermined position in a direction perpendicular or parallel to the optical axis L. By such arrangement, therefore, the lens module 1 can achieve auto focusing (AF) or optical image stabilization (OIS).

In a second embodiment, the lens module (not shown) includes a second lens barrel (not shown) in addition to the first lens barrel described above. The second lens barrel includes at least one second lens (not shown), and another optical axis (not shown) of the second lens coincides with the optical axis L of the above described first lenses. An outer wall of the second lens barrel has two third ribs (not shown) parallel to the optical axis, and the first element is provided with two third guiding grooves (not shown) in addition to the first and second guiding grooves. When the second lens barrel is disposed in the accommodating space of the first element, the third ribs are disposed in the third guiding grooves, so that the second lens barrel can be moved with respect to the first element along the optical axis L. It is worth noting that the first guiding grooves, the second guiding grooves, the third guiding grooves and the optical axis L are also coplanar. The arrangement of other elements and operation are similar to those of the first embodiment, and therefore the descriptions thereof are omitted.

In a third embodiment, the second opening portion 621 of the second barrier of the first element (not shown) is omitted. In other words, the bottom of the first element is closed. When disposed in the accommodating space of the first element, the first lens barrel 3 is supported by the second barrier. It is worth noting that the first ribs 121 and the second ribs 123 of the lens barrel 3 can be omitted since the first lens barrel 3 is supported by the second barrier. The arrangement of other elements and operation are similar to those of the first embodiment, and therefore the descriptions thereof are omitted.

The lens module 1 of the invention includes the first element 5 which has at least one opening portion to carry at least one lens barrel. When the lens barrel and the first element 5 are assembled, the outer wall of the lens barrel is exposed from the opening portion and is not protruded from the first element 5. In such arrangement, the height (or thickness) of the lens module 1 is not increased, so that the optical apparatus (for example, mobile phone) provided with the lens module 1 can be miniaturized.

Figure 4:
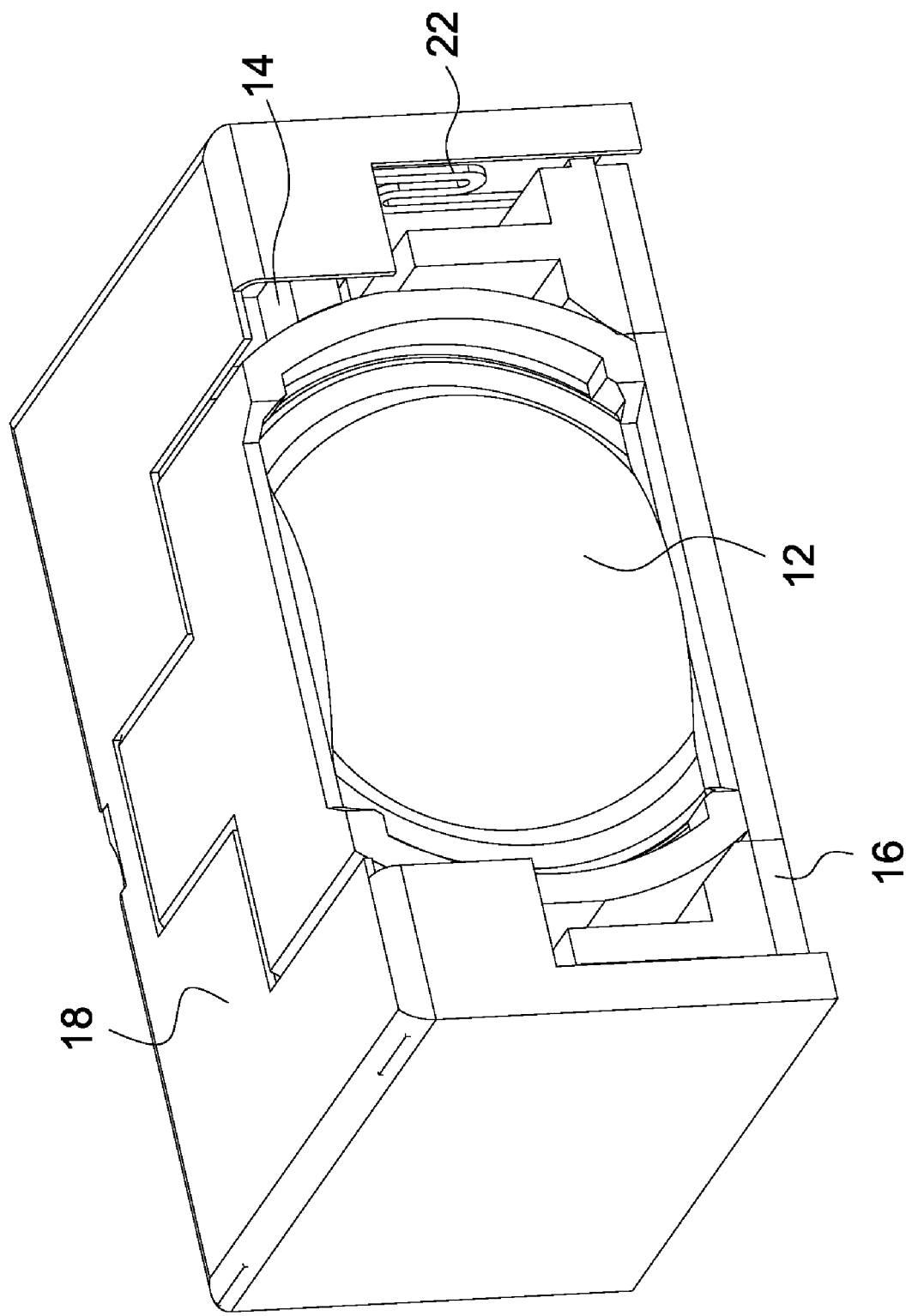
FIG. 4 is a perspective view of a lens module in accordance with a fourth embodiment of the invention.
Figure 5:
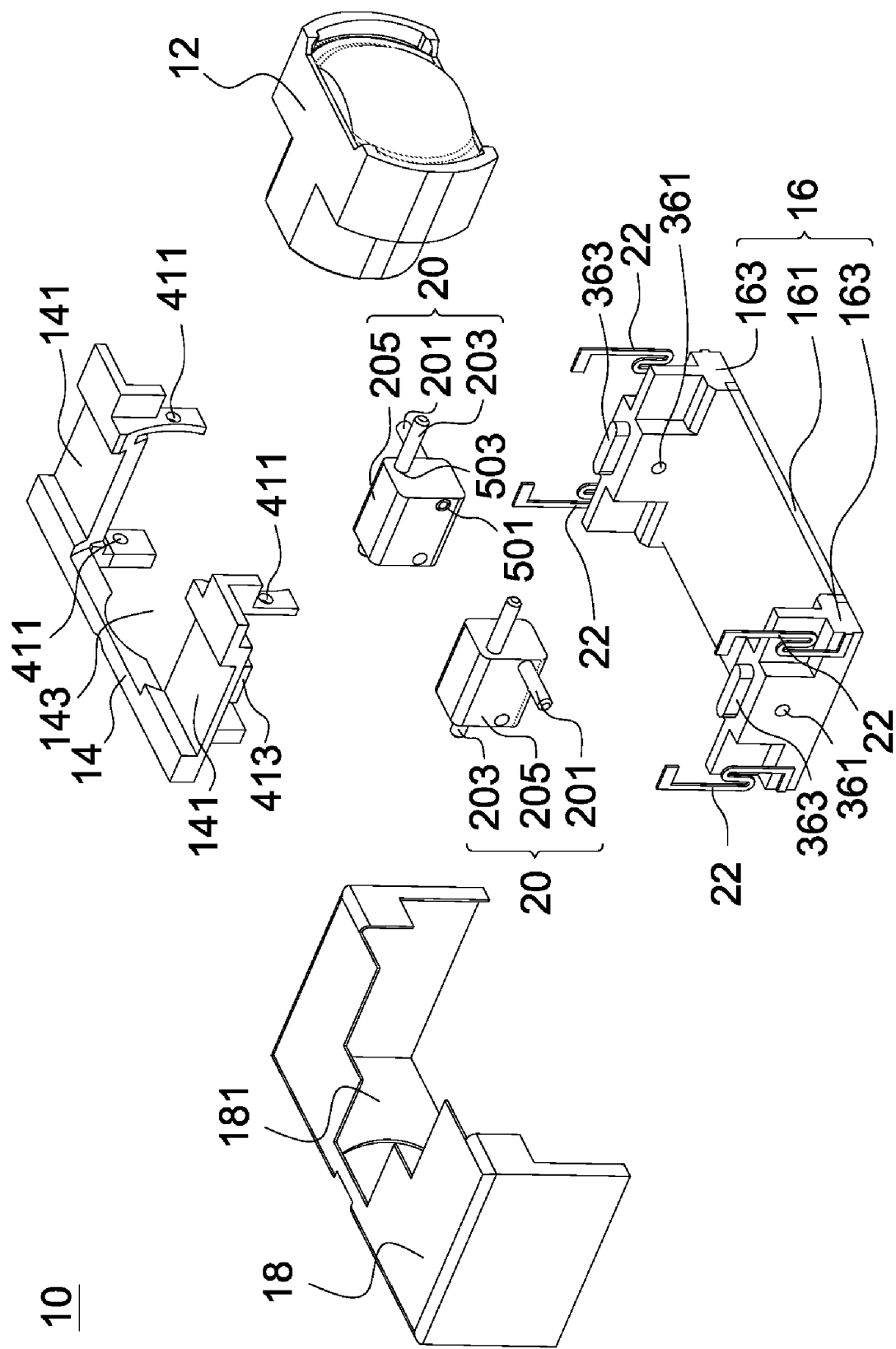
FIG. 5 is an exploded view of the lens module of FIG. 4.

Referring to FIGS. 4 and 5, a lens module 10 in accordance with a fourth embodiment of the invention includes a lens barrel 12, a first element 14, a base 16, a cover 18, two guiding structures 20, four elastic elements 22 and two drivers (not shown), wherein the lens barrel 12 is configured to move in a predetermined direction through the guiding structure 20. The detail of the elements of the lens module 10 and the assembly thereof are described in the following.

The lens barrel 12 includes at least one lens which has an optical axis (not shown). The outline of the lens barrel 12 is non-circular when observed from an object side and along the optical axis. As shown in FIG. 5, the base 16 includes a plate 161 and two first barriers 163, wherein the first barriers 163 are disposed on two opposite sides of the plate 161, extend from the plate 161 towards the first element 14 and are perpendicular to the plate 161. Each first barrier 163 has a first hole 361 and a first mounting portion 363. An accommodating space is formed by the plate 161 and the first barriers 163 to accommodate the lens barrel 12. Each guiding structure 20 includes a first rod 201, a second rod 203 and a limiting element 205, the limiting element 205 has a first through hole 501 and a second through hole 503, and the first through hole 501 is perpendicular to the second through hole 503. The first element 14 has two second barriers 141 disposed opposite each other and a first opening portion 143. The first opening portion 143 is provided on a top surface of the first element 14, which is substantially parallel to the plate 161 of the base 16. The second barriers 141 are extended towards the base 16 from the top surface. Each second barrier 141 has two second holes 411 and a second mounting portion 413. Each driver includes a magnetic element (not shown) and a coil (not shown). In the fourth embodiment, the cover 18 has a top surface facing the base 16 (or disposed parallel to the plate 161), and the top surface is provided with a third opening portion 181.

A diameter of the first hole 361 substantially equals a diameter of the first rod 201 (that is, the first rod 201 is tight fitted in the first hole 361), a diameter of the first through hole 501 is greater than the diameter of the first rod 201 (that is, the first rod 201 is loose fitted in the first through hole 501), a diameter of the second hole 411 substantially equals a diameter of the second rod 203 (that is, the second rod 203 is tight fitted in the second hole 411), and a diameter of the second through hole 503 is greater than the diameter of the second rod 203 (that is, the second rod 203 is loose fitted in the second through hole 503). Specifically, the first hole 361, the first through hole 501, the second hole 411 and the second through hole 503 are circular. If the diameter of the first hole 361, the first through hole 501, the second hole 411 or the second through hole 503 substantially equals the diameter of the first rod 201 or the second rod 203, then a tight fit is created between the rod and the hole (or through hole). If the diameter of the first hole 361, the first through hole 501, the second hole 411 or the second through hole 503 is greater than the diameter of the first rod 201 or the second rod 203, then a loose fit is created between the rod and the hole (or through hole).

A tight fit is created when a ratio of the diameter of the first hole 361, the first through hole 501, the second hole 411 or the second through hole 503 to the diameter of the first rod 201 or the second rod 203 is greater than 0.8. The rod is fixed in the hole (through hole) if a tight fit is created therebetween. The closer the ratio is to one, the tighter the fitting between the rod and hole (through hole) is. On the other hand, a loose fit is created when the ratio of the diameter of the first hole 361, the first through hole 501, the second hole 411 or the second through hole 503 to the diameter of the first rod 201 or the second rod 203 equals or is smaller than 0.8, and a loose fit allows a relative motion between the rod and hole (through hole).

Figure 6:
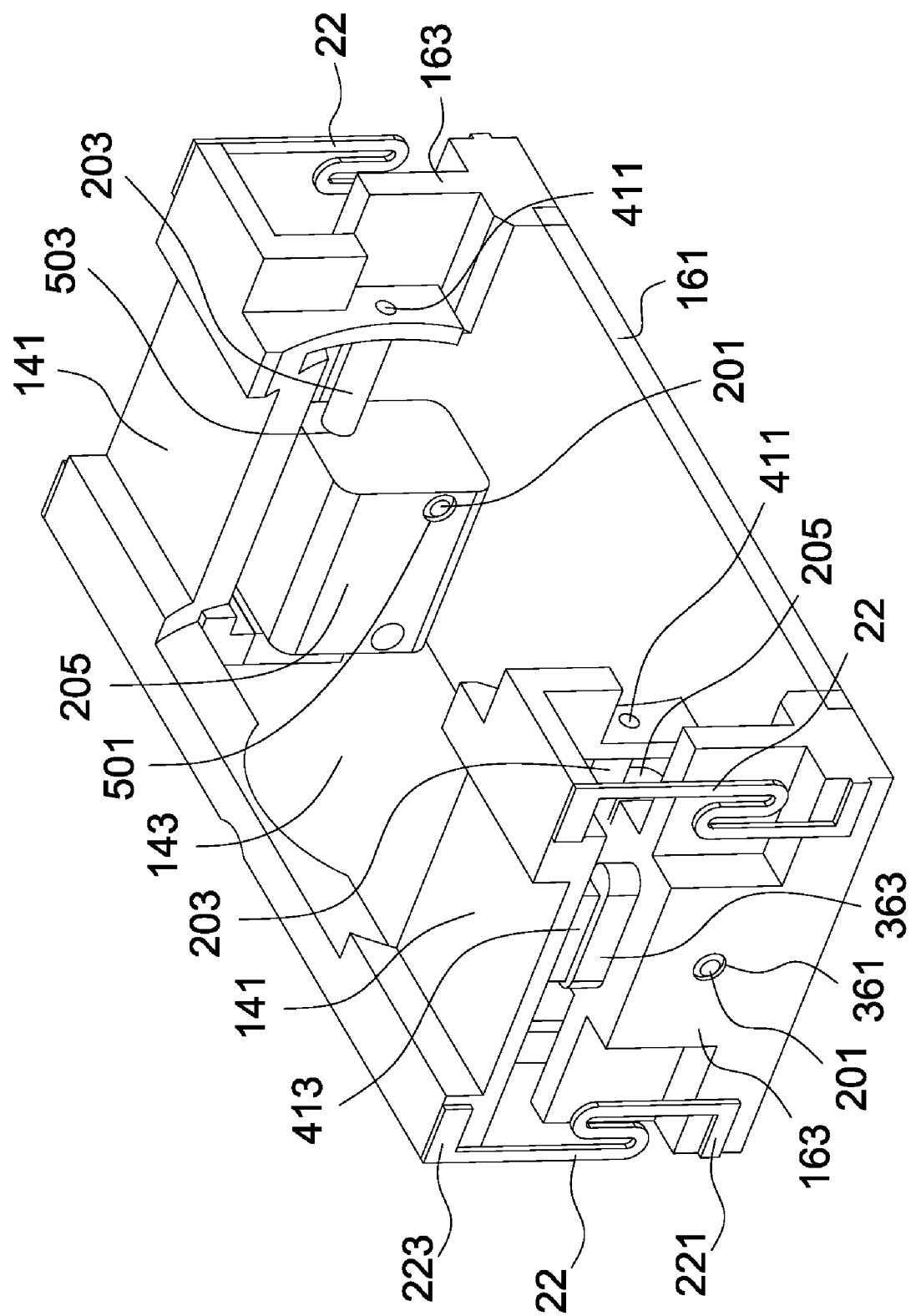
FIG. 6 is a perspective view of an assembly of a first element, a base, an elastic element and a guiding structure of FIG. 5.
Figure 7:
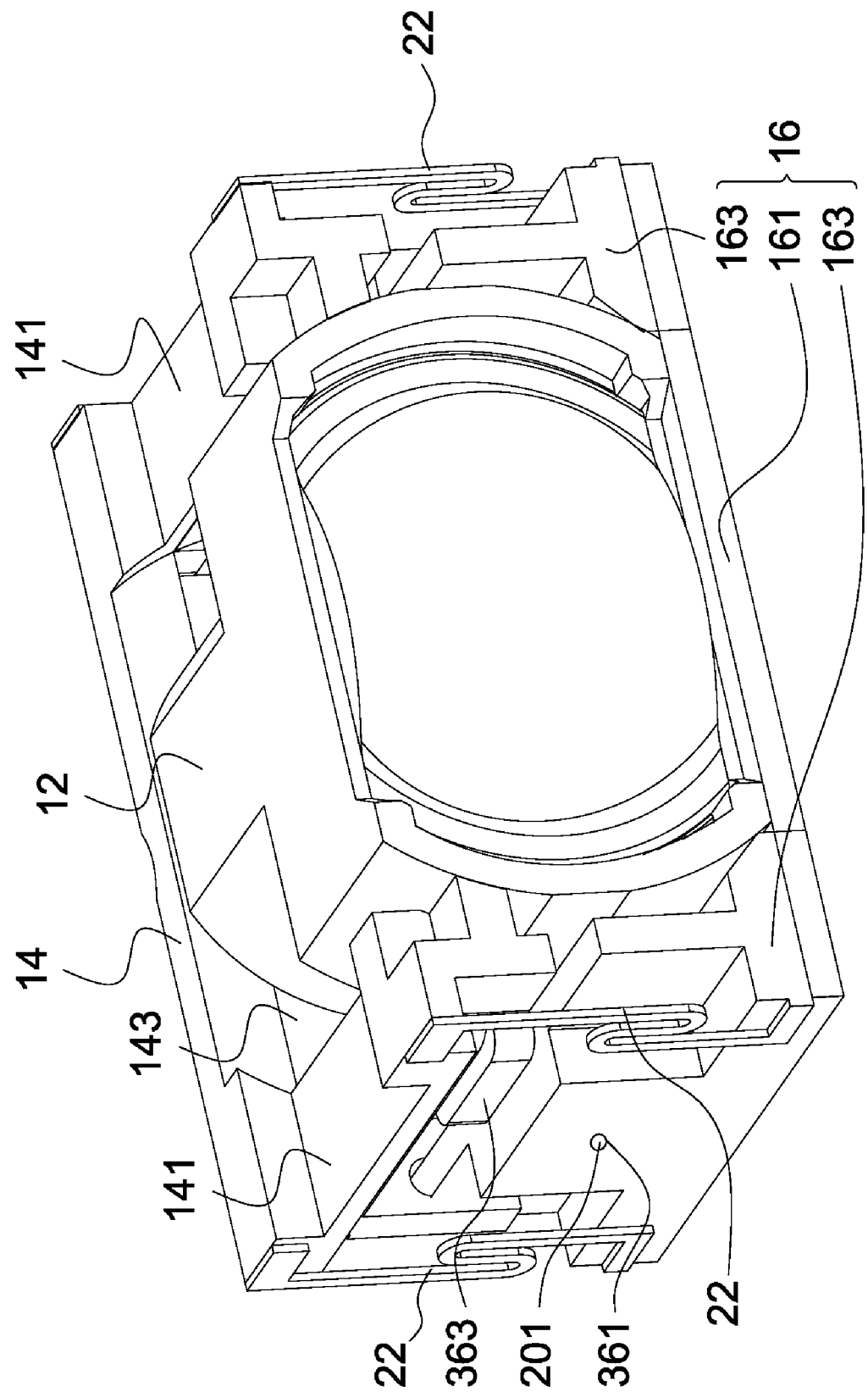
FIG. 7 is a perspective view of an assembly of a lens barrel, the first element, the base, the elastic element and the guiding structure of FIG. 5.

Referring to FIGS. 6 and 7, according to the fitting arrangement described above, one end of the first rod 201 is fixed in the first hole 361, and the other one end of the first rod 201 is movably penetrated through the first through hole 501 (that is, the limiting element 205 is disposed around the first rod 201). The second rod 203 is movably penetrated through the second through hole 503 (that is, the limiting element 205 is disposed around the second rod 203), and two ends of the second rod 203 are fixed in the second holes 411, so that the limiting element 205 is disposed between the first element 14 and the base 16. In such arrangement, the first element 14 and the limiting elements 205 can be moved with respect to the base 16 in an axial direction of the first rod 201 (that is, a direction perpendicular to the optical axis), and the movement of the first element 14 and the limiting elements 205 are restricted by a contact of the limiting element 205 with the first barrier 163. The first element 14 can further be moved with respect to the limiting elements 205 and the base 16 in an axial direction of the second rod 203 (that is, a direction parallel to the optical axis), and the movement of the first element 14 is restricted by a contact of the second barrier 141 on the limiting element 205. When the lens barrel 12 is disposed in the accommodating space, the first element 14 is connected to an outer circumferential portion of the lens barrel 12, the first through hole 501 is perpendicular to the optical axis, and the second through hole 503 is parallel to the optical axis.

As shown in FIG. 6, the two drivers has two magnetic elements disposed on two first mounting portions 363, and two coils disposed on two second mounting portions 413. It is worth noting that the coil and the magnetic element are disposed opposite each other, and an area of the coil is smaller than an area of the magnetic element. When current flows through the coil, the electrons therein experience a Lorentz force produced by the magnetic element so that the first element 14 is moved with respect to the base 16. Moreover, each elastic element 22 has a first end portion 221 and a second end portion 223, wherein the first end portion 221 is fixed to the base 16, and the second end portion 223 is fixed to the first element 14, so that the first element 14 can return to and be kept at a location after moved away from the location with respect to the base 16. In the fourth embodiment, each the elastic element 22 is elongated and has a meandering portion, wherein the meandering portion is S-shaped. The poles of the magnetic element of the first driver are arranged parallel to the first rod 201, and the poles of the magnetic of the second driver are arranged parallel to the optical axis.

As shown in FIG. 4, the assembly of the lens barrel 12, the first element 14, the base 16, the guiding structures 20, the elastic elements 22 and the drivers are disposed in the cover 18. It is worth noting that a maximum measurement of the third opening portion 181 is greater than a maximum measurement of a corresponding portion of the lens barrel 12, and a maximum measurement of the first opening portion 143 is greater than the maximum measurement of the third opening portion 181 and is also greater than the maximum measurement of the corresponding portion of the lens barrel 12. It is required that A>1, B>1, C>1, A>B, and B>C wherein A is a ratio of the maximum measurement of the first opening portion 143 to the maximum measurement of the corresponding portion of the lens barrel 12, B is a ratio of the maximum measurement of the first opening portion 143 to the maximum measurement of the third opening portion 181, and C is a ratio of the maximum measurement of the third opening portion 181 to the maximum measurement of the corresponding portion of the lens barrel 12. Therefore, after the lens module 10 is assembled, a top surface of the lens barrel 12 facing the cover 18 is exposed from the third opening portion 181 or the first opening portion 143.

Further, a measurement of the third opening portion 181 is greater than a measurement of the corresponding portion of the lens barrel 12, and a measurement of the first opening portion 143 is greater than a measurement of the third opening portion 181 and is also greater than a measurement of the corresponding portion of the lens barrel 12. If an axis is perpendicular to the optical axis and the first rod 201, then the above-mentioned top surface of the cover 18 and top surface of the first element 14 are perpendicular to the axis. The measurement of the third opening portion 181 is an area of an opening provided on the top surface of the cover 18, the measurement of the first opening portion 143 is an area of an opening provided on the top surface of the first element 14, and the measurement of the corresponding portion of the lens barrel 12 is a sectional area of the lens barrel 12 where the top surface of the first element 14 is disposed.

During operation of the lens module 10, the second driver drives the first element 14 to move the lens barrel 12 with respect to the base 16 in a direction parallel to the optical axis, and the first driver drives the first element 14 and the limiting elements 205 to move with respect to the base 16 in a direction perpendicular to the optical axis, so that the lens module 10 achieves auto focusing (AF) or optical image stabilization (OIS). Specifically, the first driver achieves the optical image stabilization (OIS), and the second driver achieves the auto focusing (AF). Further, the above operation can be described in different ways. For example, the drivers drive the base 16 and the limiting elements 205 to move the lens barrel 12 with respect to the first element 14 in the direction parallel to the optical axis and drive the base 16 to move with respect to the first element 14 and the limiting elements 205 in the direction perpendicular to the optical axis.

In the fourth embodiment, the plate 161 and the first barrier 163 are integrally formed in unitary construction, the lens barrel 12 and the first element 14 are integrally formed in unitary construction, the first barrier 163 and the first rod 201 are integrally formed in unitary construction, and/or the first element 14 and the second rod 203 are integrally formed in unitary construction.

In addition to the described fitting arrangement, at least three other fitting arrangements are feasible by changing the diameter of the first hole 361, the first through hole 501, the second hole 411, or the second through hole 503 and correspondingly changing the diameter of the first rod 201 or the second rod 203. For example, the first rod 201 is loose fitted in the first hole 361 and is tight fitted in the first through hole 501, and the second rod 203 is loose fitted in the second hole 411 and is tight fitted in the second through hole 503. For another example, the first rod 201 is tight fitted in the first hole 361 and is loose fitted in the first through hole 501, and the second rod 203 is loose fitted in the second hole 411 and is tight fitted in the second through hole 503. For another example, the first rod 201 is loose fitted in the first hole 361 and is tight fitted in the first through hole 501, and the second rod 203 is tight fitted in the second hole 411 and is loose fitted in the second through hole 503. It is worth noting that any of the above fitting arrangements enables the lens module 10 to operate in the same way (in the way as described above).

It is understood that the structure of the first element 14 and the structure of the base 16 can be exchanged with each other. For example, the first barrier 163 can be modified to have the second mounting portion 413, and the second barrier 141 can be modified to have the first mounting portion 363. Alternatively, the first barrier 163 can be modified to have the second holes 411, and the second barrier 141 can be modified to have the first hole 361. It is worth noting that the lens module 10 can still be operated as described above, even if the structure of the first element 14 and the structure of the base 16 are exchanged with each other. The outline of the lens barrel 12 includes two curved portions and two straight portions when the lens barrel 12 is observed from the object side and along the optical axis. However, it is understood that the outline of the lens barrel 12' can be modified to be circular. It is also understood that the third opening portion 181 of the cover 18 can be omitted.

Figure 8:
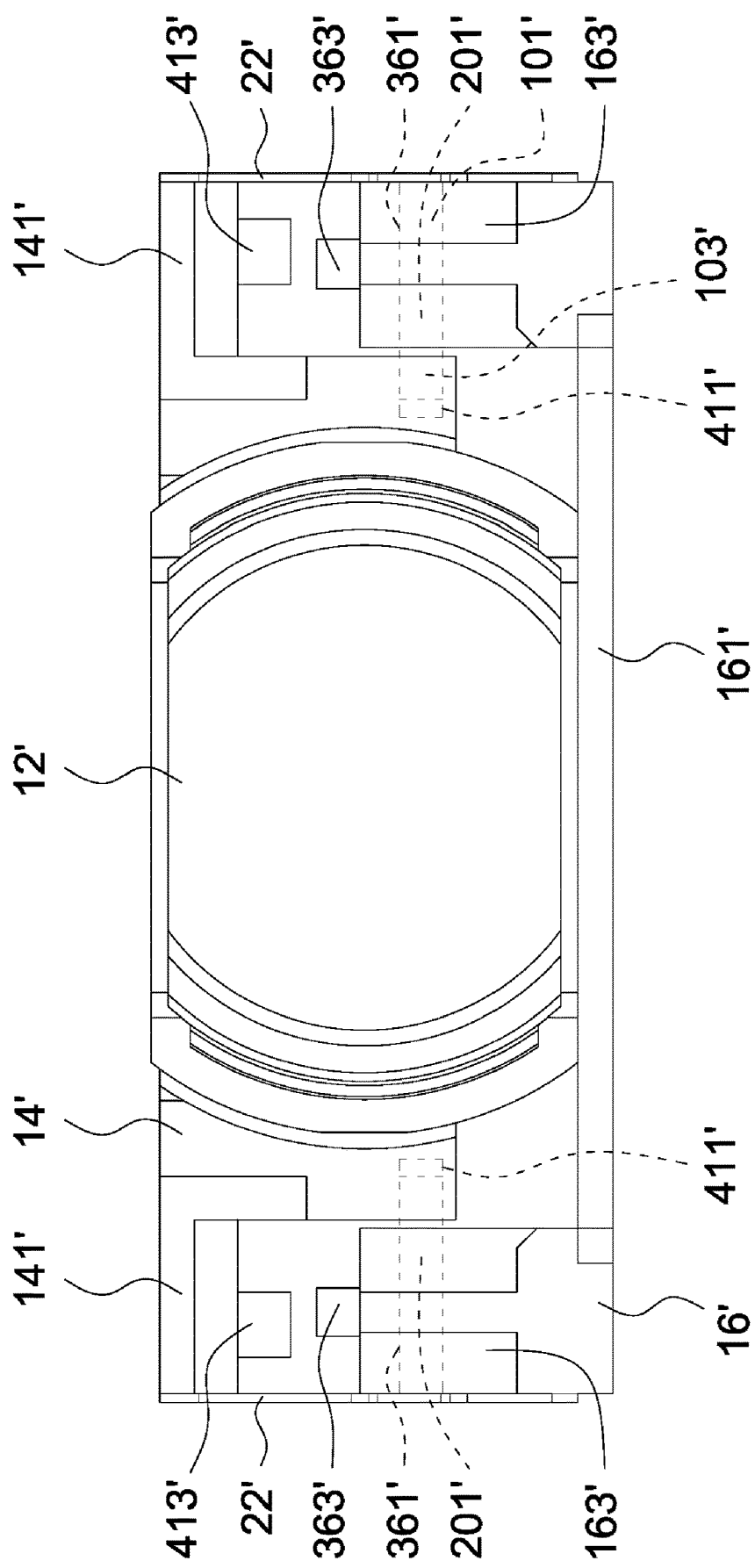
FIG. 8 is a frontal view of a lens module in accordance with a fifth embodiment of the invention.
Figure 9:
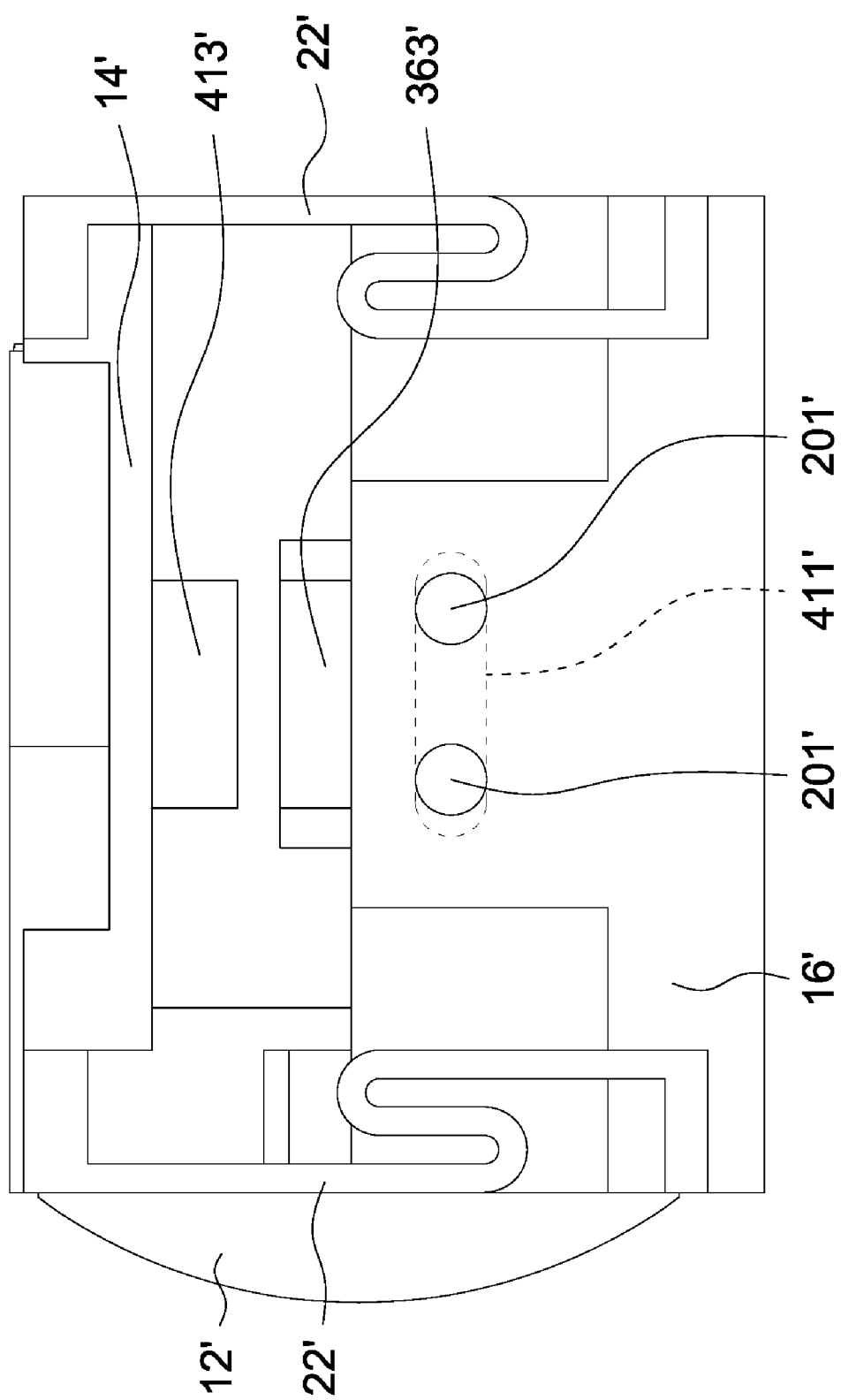
FIG. 9 is a side view of the lens module of FIG. 8.
Figure 10:
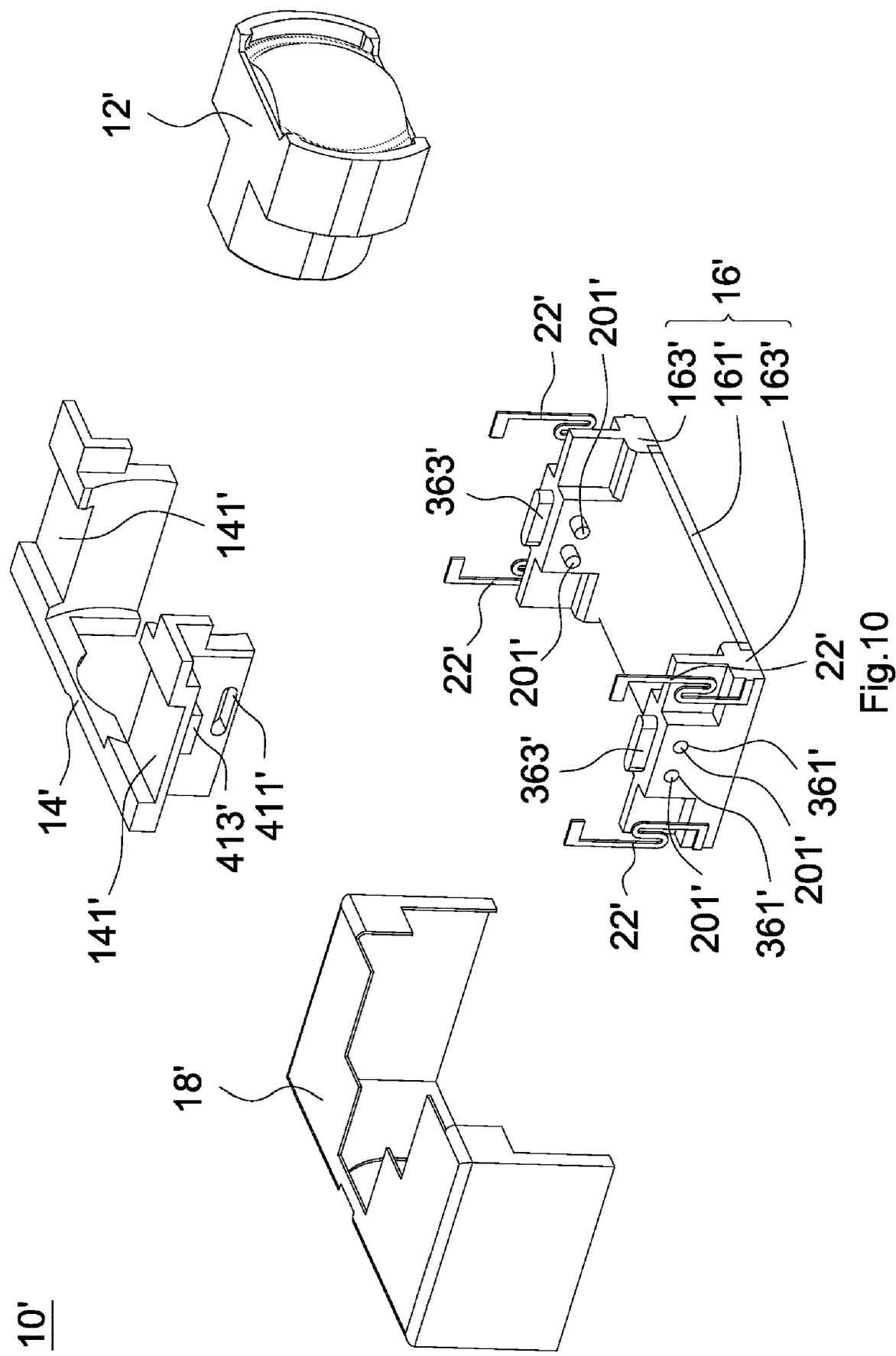
FIG. 10 is an exploded view of the lens module of FIG. 8.

Referring to FIGS. 8-10, a lens module 10' in accordance with a fifth embodiment of the invention includes a lens barrel 12', a first element 14', a base 16', a cover 18', two guiding structures, four elastic elements 22' and two drivers (not shown). The lens barrel 12' includes at least a lens, and the lens has an optical axis (not shown). As shown in FIG. 10, the base 16' includes a plate 161' and two first barriers 163', wherein the first barriers 163' are disposed on two opposite sides of the plate 161', extend from the plate 141' towards the first element 14' and are perpendicular to the plate 161'. Each first barrier 163' has two first holes 361' and a first mounting portion 363'. Each guiding structure includes two first rods 201'. The first element 14' has two second barriers 141' disposed opposite each other. The second barriers 141' extend from a top surface of the first element 14' towards the base 16' wherein the top surface is parallel to the plate 161'. Each second barrier 141' has a second hole 411' and a second mounting portion 413'.

A diameter of the first hole 361' substantially equals a diameter of the first rod 201' (that is, the first rod 201' is tight fitted in the first hole 361'), and a diameter of the second hole 411' is greater than the diameter of the first rod 201' (that is, the first rod 201' is loose fitted in the second hole 411'). In the fifth embodiment, the second hole 411' is elongated, while the first hole 361' is circular for the first rod 201' to be tight fitted therein.

In the fifth embodiment, a tight fit is created when a ratio of the diameter of the first hole 361' or the second hole 411' to the diameter of the first rod 201' is greater than 0.8. The rod is fixed in the hole if a tight fit is created therebetween. The closer the ratio is to one, the tighter the fitting between the rod and hole is. When the ratio of the diameter of the first hole 361' or the second hole 411' to the diameter of the first rod 201' equals or is smaller than 0.8, a loose fit is created that allows a relative motion between the rod and hole.

As shown in FIG. 8, each first rod 201' has a first end portion 101' and a second end portion 103'. According to the fitting arrangement described above, the first end portions 101' are fixed to the first holes 361', and the second end portions 103' are movably penetrated through the second hole 411'. In the fifth embodiment, the poles of the magnetic element of the first driver are arranged parallel to the first rod 201', and the poles of the magnetic element of the second driver are arranged parallel to the optical axis. In such arrangement, the first driver is able to drive the first element 14' to move with respect to the base 16' in an axial direction of the first rod 201' (that is, a direction perpendicular to the optical axis), and the second driver is able to drive the first element 14' to move with respect to the base 16' in a direction parallel to the optical axis. It is worth noting that a range of the movement of the first element 14' is determined by a range of the movement of the first rods 201' in the second hole 411'.

It is worth noting that the lens module 10' can be operated in the same way (in the way as described above) even if each guiding structure only has one first rod 201' (therefore each first barrier 163' has only one first hole 361'). Instead of a single rod, two first rods 201' are provided in the fifth embodiment for the purpose of stabilizing the movement of the first element 14' with respect to the base 16'.

In the fifth embodiment, the plate 161' and the first barrier 163' are integrally formed in unitary construction, the lens barrel 12' and the first element 14' are integrally formed in unitary construction, and/or the first barrier 163' and the first rod 201' are integrally formed in unitary construction.

Similarly, in addition to the described fitting arrangement, another fitting arrangement is feasible by changing the diameter of the first hole 361' or the second hole 411' and correspondingly changing the diameter of the first rod 201'. For example, the first rod 201' is loose fitted in the first hole 361' and is tight fitted in the second hole 411' wherein the first hole is elongated and the second hole is circular for the first rod 201' to be tight fitted therein. The arrangement of other elements and operation are similar to those of the fourth embodiment, and therefore the descriptions thereof are omitted. The outline of the lens barrel 12' includes two curved portions and two straight portions when the lens barrel 12' is observed from an object side and along the optical axis. However, the outline of the lens barrel 12' can be modified to be circular. Further, the third opening portion of the cover 18' can be omitted.

In the fourth and the fifth embodiments, an axial direction (not shown) is simultaneously perpendicular to the optical axis and the first rod 201, 201'. The lens module 10, 10' sequentially includes the cover 18, 18', the first element 14, 14', the lens barrel 12, 12' and the base 16, 16' in the axial direction. The first element 14, 14' is fixed to the lens barrel 12, 12' by means of a first connecting surface (not shown). The base 161, 161' contacts the lens barrel 12, 12' by means of a second connecting surface (not shown), or the base 161, 161' does not contact the lens barrel 12, 12'. The lens module 10, 10' sequentially includes the cover 18, 18', the first barrier 163, 163', the first element 14, 14', the plate 161, 161' and the lens barrel 12, 12' in the axial direction of the first rod 201, 201'. An inner surface (not shown) of the cover 18, 18' contacts the first barrier 163, 163' and the first element 14, 14'.

In the fourth and the fifth embodiments, the plate 161, 161' is made of metallic material.

In the fourth and the fifth embodiments, the magnetic element and the coil of the driver can be substituted with a voice coil motor and piezoelectric material.

In the fourth and the fifth embodiments, the arrangement of the poles of the first driver and that of the second driver can be exchanged.

In the fourth and the fifth embodiments, the first holes 361, 361' and the second holes 411, 411' can be recesses or through holes.

Figure 11:
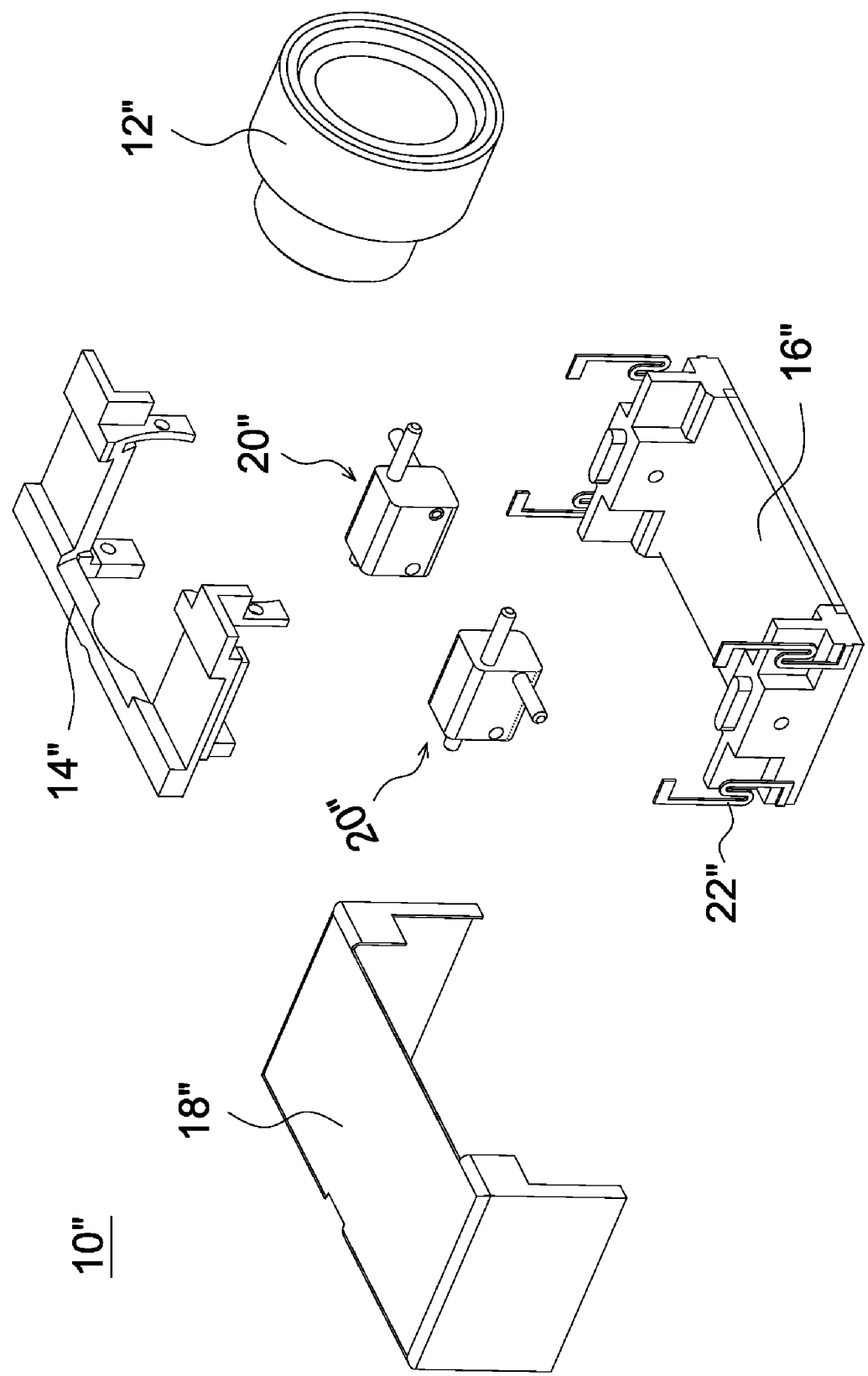
FIG. 11 is an exploded view of a lens module in accordance with a sixth embodiment of the invention.

Referring to FIG. 11, a lens module 10" in accordance with a sixth embodiment of the invention includes a lens barrel 12", a first element 14", a base 16", a cover 18", two guiding structures 20", four elastic elements 22" and two drivers (not shown), wherein the outline of the lens barrel 12" is circular when the lens barrel 12" is observed from an object side and along the optical axis, and the third opening portion of the cover 18" is omitted. The arrangement of other elements and operation are similar to those of the fourth embodiment, and therefore the descriptions thereof are omitted. Moreover, it can be seen from FIG. 11 that the lens module 10" of the sixth embodiment is implemented by modifying that of the fourth embodiment. However, it is understood that the structural feature of the sixth embodiment can be implemented in the fifth embodiment.

What is claimed is:
1. A lens module, comprising:
a first lens barrel comprising a first outer wall and a plurality of first lenses, wherein the first lenses have an optical axis formed from an object side to an image side; and
a first element configured to carry the first lens barrel and comprising an outer circumferential portion, wherein the outer circumferential portion surrounds the optical axis and comprises at least four barriers, at least one of the barriers is provided with a first guiding groove, and the barriers form an accommodating space in which the first lens barrel is disposed;
wherein at least one of the barriers has an opening portion to expose the first outer wall of the first lens barrel, and a part of the first outer wall of the first lens barrel is disposed inside the opening portion without protruding therefrom.

2. The lens module as claimed in claim 1, wherein the first guiding groove is parallel to the optical axis, the first outer wall of the first lens barrel has a first rib parallel to the optical axis, and the first rib is disposed in the first guiding groove.

3. The lens module as claimed in claim 2, further comprising a second lens barrel, wherein the second lens barrel comprises at least one second lens and is disposed in the accommodating space.

4. The lens module as claimed in claim 3, wherein at least one of the barriers is provided with a second guiding groove parallel to the optical axis, the second lens barrel comprises a second outer wall, the second outer wall of the second lens barrel has a second rib parallel to the optical axis, and the second rib is disposed in the second guiding groove.

5. The lens module as claimed in claim 4, wherein the first guiding groove, the second guiding groove and the optical axis are coplanar.

6. The lens module as claimed in claim 1, further comprising a first driver configured to drive the first lens barrel to move in a direction perpendicular or parallel to the optical axis.

7. The lens module as claimed in claim 6, wherein the first driver comprises a first magnetic element and a first coil, the first magnetic element is fixed outside at least one of the barriers, and the first coil is disposed opposite the first magnetic element.

8. A lens module, comprising:
a lens barrel comprising an outer circumferential portion and at least one lens, wherein the lens has an optical axis;
a first element connected to the outer circumferential portion of the lens barrel;
a base comprising a plate and a plurality of first barriers, wherein the first barriers are disposed on the plate and opposite each other, the plate and the first barriers form an accommodating space, the lens barrel is disposed in the accommodating space, and the first barriers have at least one first hole;
at least one first rod penetrated through the first hole to define an axial direction perpendicular to the optical axis;
at least one elastic element comprising an end portion fixed to the base, and another end portion fixed to the first element, so that the first element can return to and be kept at a location after moved away from the location with respect to the base; and
a driver configured to drive the lens barrel to move in the axial direction of the first rod and along the optical axis;
wherein the first rod is configured to guide movement of the lens barrel in the axial direction.

9. The lens module as claimed in claim 8, wherein the first element comprises a plurality of second barriers disposed opposite each other and the second barriers have at least one second hole.

10. The lens module as claimed in claim 9, wherein the first rod is penetrated through the first hole and the second hole, and the first hole is disposed opposite the second hole;
wherein the second hole is greater than the first rod in diameter when the first hole is fixed to the first rod, or the first hole is greater than the first rod in diameter when the second hole is fixed to the first rod;
wherein the driver is configured to drive the first element to move the lens barrel along the optical axis and in the axial direction of the first rod, or the driver is configured to drive the base to move the first rod so that the lens barrel is moved along the optical axis and in the axial direction of the first rod.

11. The lens module as claimed in claim 9, further comprising:
a plurality of limiting elements which are disposed between the first element and the base and have a first through hole extending perpendicular to the optical axis and a second through hole extending parallel to the optical axis, wherein the first rod is penetrated through the first hole and the first through hole, and the limiting element is disposed around the first rod; and
at least one second rod penetrated through the second through hole and comprising two ends, wherein the second barriers have a plurality of second holes, the ends are penetrated through the second holes, the second holes extend parallel to the optical axis, and the limiting element is disposed around the second rod;
wherein the driver is configured to drive the first element to move the lens barrel along the optical axis and in the axial direction of the first rod, or the driver is configured to drive the base to move the first rod so that the lens barrel is moved along the optical axis and in the axial direction of the first rod.

12. The lens module as claimed in claim 11, wherein the first through hole is greater than the first rod in diameter when the first hole is fixed to the first rod, or the first hole is greater than the first rod in diameter when the first through hole is fixed to the first rod.

13. The lens module as claimed in claim 8, further comprising:
a cover configured to accommodate the lens barrel and the base, wherein the cover comprises a third opening portion, the third opening portion is provided on a top surface of the cover facing and parallel to the plate, and the lens barrel further comprises a surface facing the top surface of the cover having the third opening portion.

14. The lens module as claimed in claim 13, wherein the first element comprises a first opening portion which is provided on a top surface facing and parallel to the plate, a maximum measurement of the first opening portion is greater than a maximum measurement of the third opening portion and greater than a maximum measurement of a corresponding portion of the lens barrel, and the maximum measurement of the third opening portion is greater than the maximum measurement of a corresponding portion of the lens barrel.

15. The lens module as claimed in claim 13, wherein the lens module sequentially comprises the cover, the first element, the lens barrel and the base in an axial direction perpendicular to the optical axis and the first rod, and the first element is fixed to the lens barrel by means of a first connecting surface.

16. The lens module as claimed in claim 13, wherein the lens module sequentially comprises the cover, the first barriers, the first element, the plate and the lens barrel in the axial direction of the first rod, an inner surface of the cover contacts the first barriers and the first element, and the first element is fixed to the lens barrel by means of a first connecting surface.

17. The lens module as claimed in claim 8 wherein the outline of the lens barrel is non-circular when observed from an object side.

18. The lens module as claimed in claim 8, wherein the base and the first barriers constitute a first construction, the lens barrel and the first element constitute a second construction, the first barriers and the first rod constitute a third construction, and at least one of the first construction, second construction, and third construction are integrally-formed unitary construction.

19. The lens module as claimed in claim 11, wherein the base and the first barriers constitute a first construction, the lens barrel and the first element constitute a second construction, the first barriers and the first rod constitute a third construction, the first element and the second rod constitute a fourth construction, and at least one of the first construction, second construction, third construction, and fourth construction are integrally-formed unitary construction.

20. The lens module as claimed in claim 8, wherein the driver is an electromagnetic driver, comprises at least one magnetic element and at least one coil and is configured to drive the lens barrel to move in the axial direction of the first rod.

* * * * *